(12) United States Patent
Sohn

(10) Patent No.: US 8,001,366 B2
(45) Date of Patent: Aug. 16, 2011

(54) METHOD FOR REDUCING BOOTING TIME OF MOBILE COMMUNICATION TERMINAL

(75) Inventor: Dong-Jin Sohn, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 945 days.

(21) Appl. No.: 11/706,877

(22) Filed: Feb. 15, 2007

(65) Prior Publication Data

US 2007/0214414 A1    Sep. 13, 2007

(30) Foreign Application Priority Data

Feb. 15, 2006 (KR) ........................ 10-2006-0014600

(51) Int. Cl.
*G06F 9/24* (2006.01)
*G06F 15/177* (2006.01)
*G06F 1/24* (2006.01)
*H04M 11/00* (2006.01)

(52) U.S. Cl. ................. 713/1; 713/2; 713/100; 455/403

(58) Field of Classification Search .................. 713/1, 2, 713/100; 455/403
See application file for complete search history.

(56) References Cited

U.S. PATENT DOCUMENTS

| | | | |
|---|---|---|---|
| 6,097,390 A * | 8/2000 | Marks | 715/772 |
| 6,463,531 B1 * | 10/2002 | Aguilar et al. | 713/2 |
| 6,477,642 B1 * | 11/2002 | Lupo | 713/2 |
| 6,791,572 B1 * | 9/2004 | Cloney et al. | 345/619 |
| 6,993,645 B2 * | 1/2006 | Joseph et al. | 713/2 |
| 2004/0059906 A1 * | 3/2004 | Park et al. | 713/2 |
| 2005/0022165 A1 * | 1/2005 | Ruff | 717/121 |
| 2005/0265531 A1 | 12/2005 | Mika | |
| 2006/0107031 A1 * | 5/2006 | Kouno et al. | 713/2 |
| 2006/0121932 A1 * | 6/2006 | Cho | 455/550.1 |
| 2008/0288763 A1 * | 11/2008 | Reik | 713/2 |

FOREIGN PATENT DOCUMENTS

| | | |
|---|---|---|
| CN | 1801831 | 7/2006 |
| GB | 2 415 877 A | 1/2006 |

* cited by examiner

*Primary Examiner* — Ji H Bae
(74) *Attorney, Agent, or Firm* — The Farrell Law Firm, P.C.

(57) ABSTRACT

A method is for reducing booting time of a mobile communication terminal. The method includes the steps of driving a User Interface (UI) task concerning performing of communications created from a memory while the mobile communication terminal is being booted; simultaneously performing an initialization of an application program in a booting initializing unit that is to be separated from the UI task, and executing an initial screen in the UI task; and completing the initialization of the application program and execution of the initial screen in the UI task, and switching to an idle screen which a user can use. As a result, booting time of the mobile communication terminal is reduced.

20 Claims, 3 Drawing Sheets

METHOD FOR REDUCING BOOTING TIME OF MOBILE COMMUNICATION TERMINAL

This application claims the benefit under 35 U.S.C. §119(a) of an application filed in the Korean Industrial Property Office on Feb. 15, 2006 and assigned Serial No. 2006-0014600, the contents of which are hereby incorporated by reference.

BACKGROUND OF THE INVENTION

1. Field of the Invention

The present invention relates to a method for reducing the booting time of a mobile communication terminal, and more particularly to a method for reducing booting time of a mobile communication terminal, which switches to an idle screen mode in which a user can make a phone call or transmit/receive character messages by separating a user interface task to initialize an application program simultaneously with executing an initial screen, after driving the user interface task concerning the communication performance created from a memory unit when a mobile communication terminal is booted.

2. Description of the Related Art

It was common that communication by mobile communication terminal was performed using a voice-grade signal in its early days. In the second generation, the communication by mobile communication terminal evolved to a communication scheme of adding signals such as characters, etc., by using digital data. The third generation mobile communication system is evolving to a multimedia communication scheme in which a video signal is added to data signals including voices, characters, etc. Recently, as the mobile communication terminal is required to support a diversity of services, the mobile communication terminal has various functions, and accordingly, needs a memory in which a large quantity of data can be stored. Memory which is widely used in a digital camera is capable of storing huge amounts of data. Therefore, in order to offer many data services, the mobile communication terminal is equipped with memory having a massive storage capacity.

The memory corresponds to a space in which basic cords and fonts are stored, and a part thereof is used as a user data area. The memory has a characteristic such that a small amount of data cannot be accessed in a scheme of an absolute address as in a ROM because a used area cannot but be erased by the sector (i.e., 64 [Kbytes]) in a case where an update of the memory is required after the memory has been used once.

An embedded file system manages a memory through a file system while all tasks are created during booting the mobile communication terminal. User data (e.g., a phone book, a Short Message Service (SMS), download contents, etc.) whose size is large are to be stored in an area of the embedded file system. The embedded file system should go through a memory initialization process in which file information is aggregated in order to freely read/write information stored in the area of the embedded file system while the embedded file system is booted at the start.

The memory of the mobile communication terminal has programs stored therein, such as programs for controlling a general operation of the mobile communication terminal, a User Interface (UI) task which can perform various programs on the same platform besides a part which performs an initial screen created as the mobile communication terminal is being booted, and programs for booting in order to switch to an idle screen that a user can use from an application executing unit that carries out an application program concerning the initial screen (e.g., animations, images, moving pictures, etc.) in the UI task.

FIG. 1 is a flowchart illustrating a booting method of a mobile communication terminal according to the prior art.

At present, although the time necessary to perform an initializing process is much reduced by many modifications of algorithms, as illustrated in FIG. 1, if the procedure moves to step 110 where a user powers up from step 100, where power source of the mobile communication terminal is OFF, tasks including the embedded file system are generated in step 120. It will be a good guide that all task software of the mobile communication terminal is carried out by tasks (e.g., UI, RX (receive), TX (transmit), SND (send), FS (file system), NV (network variable), etc.)

In step 130, the UI task, which can perform various programs on the same platform besides the part performing the initial screen among created tasks, is initialized, and operates.

After a platform in the UI task is driven in step 140, the initial screen including animations, images, moving pictures, etc., is carried out by the application executing unit in the UI task in step 160. The application executing unit carries out an initialization of the application program in step 150 before carrying out the initial screen, or in step 170 after carrying out the initial screen is completed, and then a change of the idle screen mode is accomplished in step 180. Because an initializing process of a relevant application program should be performed during driving the UI task, it takes a lot of time at every booting.

Since the conventional mobile communication terminal takes a great amount of time in booting, it inconveniences the user.

SUMMARY OF THE INVENTION

Accordingly, the present invention has been made to solve the above problems occurring in the prior art, and it is an aspect of the present invention to provide a method for reducing booting time of a mobile communication terminal and solving a user's inconvenience.

In order to accomplish the above aspects of the present invention, there is provided a method for reducing booting time of a mobile communication terminal according to an embodiment of the present invention, including: driving a User Interface (UI) task concerning carrying on communications created from a memory during booting; simultaneously performing an initialization of an application program in a booting initializing unit which is to be separated from the UI task, and executing an initial screen in the UI task; and completing the initialization of the application program after execution of the initial screen in the UI task is completed, and switching a current screen to an idle screen.

It is desirable that completing the initialization of the application program includes switching to an idle screen after completing the initialization of the application program during execution of the initial screen in the UI task.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE INVENTION

Figure 1:
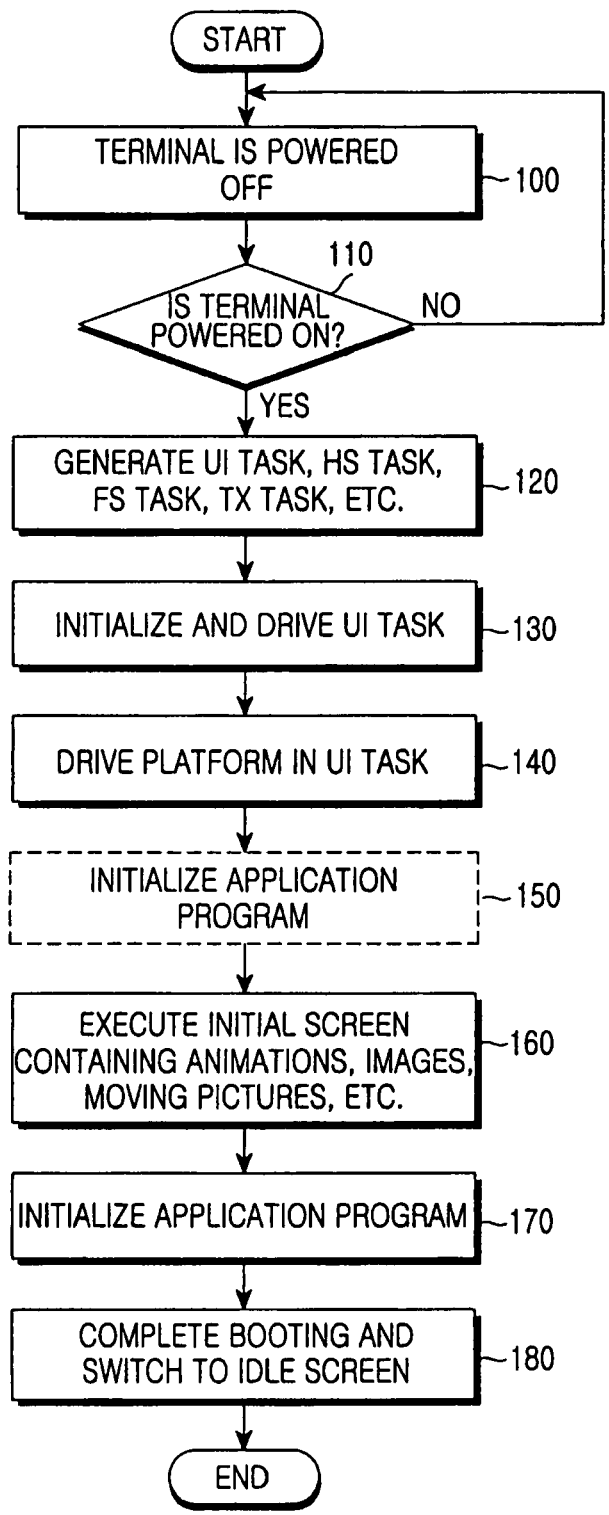
FIG. 1 is a flowchart illustrating a booting method of a mobile communication terminal according to a prior art.

Hereinafter, preferred embodiments of the present invention will be described with reference to the accompanying drawings. Same elements will be designated by same reference numerals all through the following description and drawings although they are shown in different drawings. Further, in the following description of the present invention, a detailed description of known functions and configurations incorporated herein will be omitted for clarity and conciseness.

Figure 2:
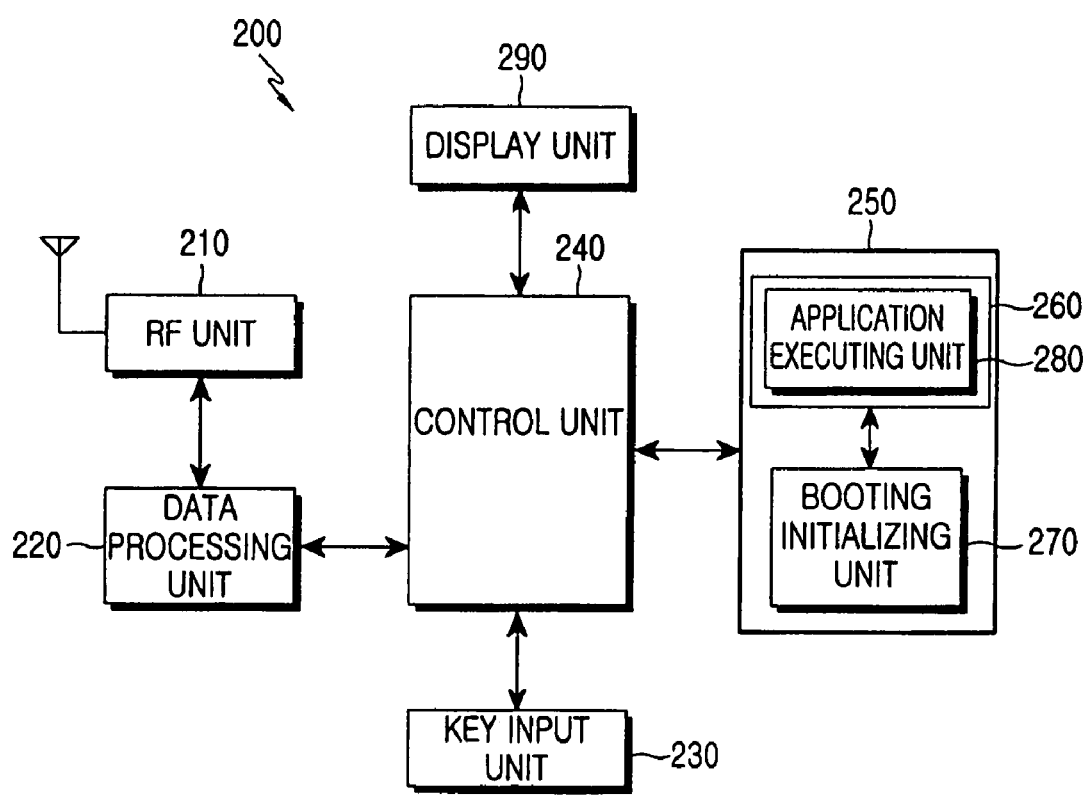
FIG. 2 is a block diagram illustrating a configuration of a mobile communication terminal according to the present invention.

Referring to FIG. 2, the mobile communication terminal 200 includes a Radio Frequency (RF) unit 210, a data processing unit 220, a key input unit 230, a control unit 240, a memory unit 250, and a display unit 290.

The RF unit 210 carries out communications of the mobile communication terminal 200. The RF unit 210 includes an RF transmitter and an RF receiver. The RF transmitter converts the frequency of a signal to be transmitted into an RF frequency thereof, and amplifies electric power of the RF signal to be transmitted. The RF receiver converts the frequency of the received RF signal into a low frequency thereof for reducing noise from the received signal.

The data processing unit 220 is equipped with a transmitter for encoding and modulating the signal to be transmitted, and a receiver for decoding and demodulating the received signal. Moreover, the data processing unit 220 can be also configured of a MOdulator/DEModulator (MODEM) and a COder/DECoder (CODEC).

The key input unit 230 is equipped with keys for inputting figures and characters information, and function keys for setting all sorts of functions.

The control unit 240 controls an overall operation of the mobile communication terminal 200. The control unit 240 controls a UI task 260 concerning user data to be created from the memory 250 when the mobile communication terminal 200 is booted due to the replacement of a battery of the mobile communication terminal 200, a system error thereof, etc., and separates a booting initializing unit 270 from the UI task 260 in order to initialize a relevant application program. Simultaneously, the control unit 240 controls the application executing unit 280 included in the UI task 260 to execute an application program concerning an initial screen, including animations, images, moving pictures, etc., and to switch a current screen mode to an idle screen mode in which a user can make a phone call or can transmit/receive character messages.

Then, in the idle screen mode, the user can input a telephone number to originate a call, or send preproduced character messages, images, moving pictures, etc. to a selected telephone number. Inversely, in the idle screen mode, the user can receive a call, character messages, etc., through the mobile communication terminal 200. Meanwhile, the user can retrieve user data, such as a phone book, etc., which has been stored in the memory 250, in the idle screen mode. When the user data is required in the idle screen mode, the control unit 240 controls the display unit 290 to display a waiting message or a waiting animation.

The memory unit 250 includes a program memory, a ROM (Read Only Memory) and a RAM (Random Access Memory) corresponding to data memories.

The memory unit 250 has programs stored therein, such as programs for controlling the general operation of the mobile communication terminal 200, the UI task 260 concerning the user data which is being created as the mobile communication terminal 200 is being booted, the booting initializing unit 270 separated from the UI task 260 in order to perform the initialization of the relevant application program from the UI task 260, and programs for booting in order to switch to the idle screen that a user can use from the application executing unit 280 that carries out an application program concerning the initial screen, including animations, images, moving pictures, etc., in the UI task 260.

Basic codes and fonts of the mobile communication terminal 200 are stored in the memory unit 250 where a partial area is used as a user data area. Furthermore, the memory unit 250 is managed through a file system called an "embedded file system." An area of the embedded file system has the user data (e.g., a phone book, a Short Message Service (SMS), download contents, etc.) stored therein, and is managed through the embedded file system.

In a preferred embodiment of the present invention, the UI task 260 represents a task created for the performance of communication. This performance of communication enables the user to originate a call to a telephone number which the user has entered, or to receive a call, and accordingly, signifies a function through which the user can send or receive character messages.

The memory unit 250 carries out a function for temporarily storing data generated in the process of executing programs. Meanwhile, in the idle screen mode, the waiting message or the waiting animation, etc., displayed in the display unit 290, can be stored in the memory unit 250 when the user retrieves and displays user data stored in the memory unit 250.

The display unit 290 displays messages which are generated in the process of executing programs under the control of the control unit 240. Herein, the display unit 290 can be embodied by using Liquid Crystal Devices (LCDs), and in this case, the display unit 290 can be equipped with an LCD controller, a memory where image data can be preserved, an LCD display device, etc., and the display unit 290 can be an input unit, in a case when the LCD is implemented in a scheme of touch screen. The display unit 290 can display the idle screen which includes the waiting message or the waiting animation which has been stored in the memory unit 250.

Figure 3:
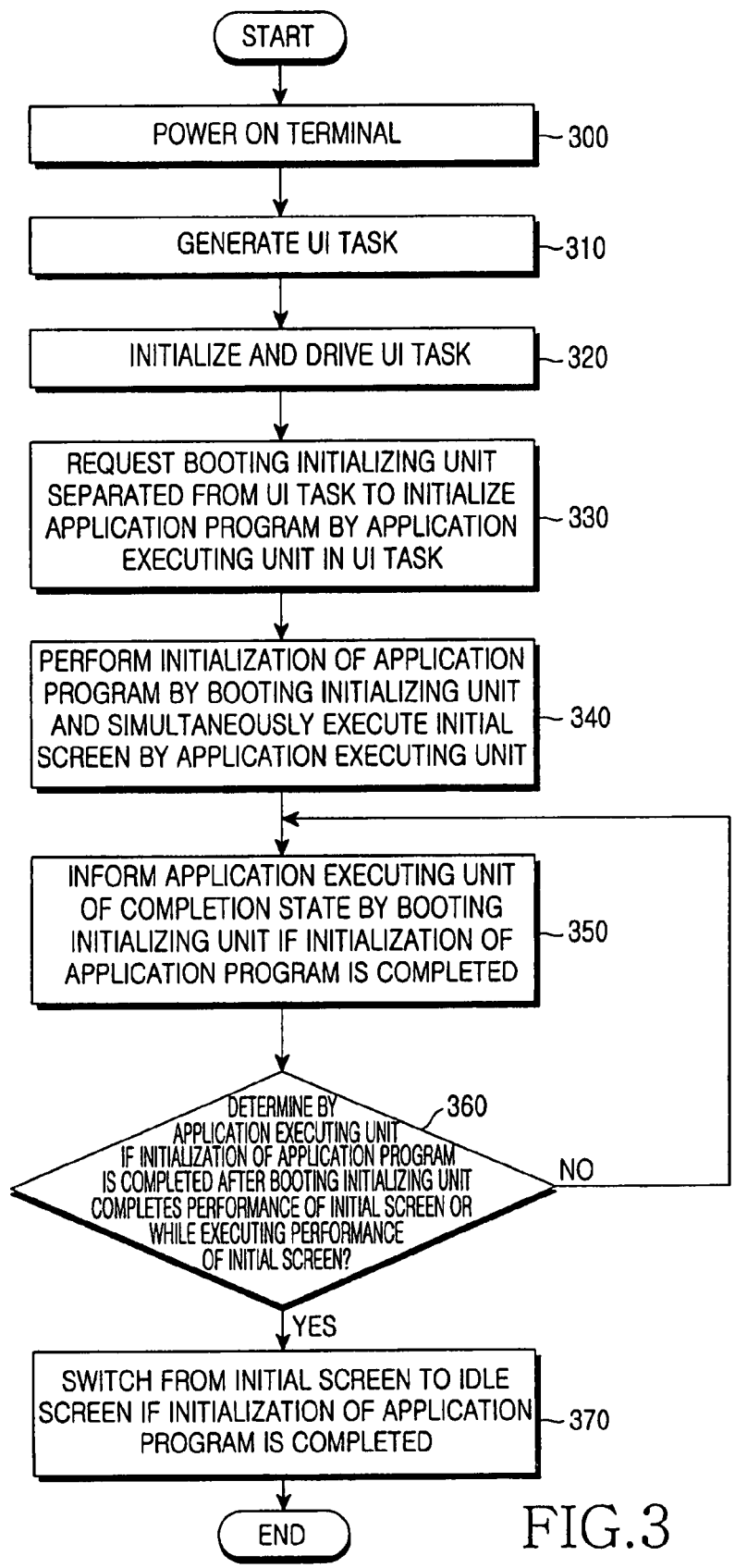
FIG. 3 is a flowchart illustrating a method for booting a mobile communication terminal according to the present invention.

Referring to FIG. 3, if a user turns on the mobile communication terminal 200 through the key input unit 230 in step 300 from a state where the mobile communication terminal 200 is powered off, the control unit 240 controls a Power Switch (PS) hold not to be powered off. In step 310, each task is generated from the memory 250 by each platform used in the mobile communication terminal 200.

In step 320, among tasks generated from the memory 250, after parts that perform the initial screen are initialized and driven, the UI task 260, which can perform various programs on a same platform, is initialized and driven as well. Furthermore, the booting initializing unit 270, which has been separated from the UI task 260, is arranged for performing the initialization of the application program, following driving a platform in the UI task 260. Thereafter, in step 330, the application executing unit 280 of the UI task 260 requests the booting initializing unit 270 to initialize the application program.

In step 340, the application executing unit 280 enables the display unit 290 to display the initial screen including preset animations, images, moving pictures, etc., simultaneously with performing the initialization of the application program through the booting initializing unit 270. In step 350, the booting initializing unit 270 carries out the initialization of the application program to complete the initialization, and then gives notice of a state of the completion of the initialization to the application executing unit 280.

In step 360, the application executing unit 280 determines if the booting initializing unit 270 completes the initialization of the application program after performance of the initial screen is completed or while performance of the initial screen is being executed.

If it is determined in step 360 that the booting initializing unit 270 completes the initialization of the application program, the application executing unit 280 switches from the initial screen mode to the idle screen mode in step 370 in which the user can make a phone call or transmit/receive character messages, and in which a waiting message or a waiting animation is displayed on the idle screen. As a result, booting time of the mobile communication terminal 200 is reduced.

If it is determined in step 360 that the booting initializing unit 270 does not complete the initialization of the application program, the procedure returns back to step 350, and the application executing unit 280 waits until the application executing unit 280 receives a notice of the state of the completion of the initialization from the booting initializing unit 270.

After that, the user can carry out a basic function of a telephone call through the idle screen. Namely, the user sends an entered telephone number to perform the function of telephone call, or the user can send preproduced character messages, images, moving pictures, etc., to the entered telephone number. In addition, the user can receive a call, character messages, etc., and can use data of phone books, data of character messages, downloaded data, etc., which are stored in the memory unit 250.

To examine a process for performing the function of a telephone call, first, if the user presses a send key following an input of a telephone number, the control unit 240 detects the input and the send key pressing, and attempts to form a telephone call with the input telephone number. If the user requests a search for the phone book, the control unit 240 detects the request, and checks if a relevant task of the telephone call is generated. If the relevant task of the telephone call is not generated, the control unit 240 detects the lack of the generation of the relevant task, and controls the display unit 290 to display a waiting message if there is any. On the contrary, if the relevant task of the telephone call is generated, the control unit 240 detects the generation of the relevant task, and enables the user to search for data in the phone book. If the user presses the send key following a selection of a telephone number, the control unit 240 attempts to start a telephone call with the selected telephone number.

The merits and effects of preferred embodiments, as disclosed in the present invention, and as so configured to operate above, will be described as follows.

As described above, the present invention can switch the terminal from a current screen mode to an idle screen mode in which a user can make a phone call or transmit/receive character messages by simultaneously performing an initialization of an application program through a booting initializing unit separated from a user interface task, and executing an initial screen, after driving the user interface task concerning the communication performance created from a memory unit when a mobile communication terminal is booted. Hence, booting time of a mobile communication terminal can be reduced.

While the invention has been shown and described with reference to a certain preferred embodiment thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for reducing booting time of a portable communication terminal, the method comprising the steps of:
   (1) driving, by a controller, a User Interface (UI) program for managing a UI corresponding to communications operations of the portable communication terminal during booting, wherein the UI program is stored from a memory;
   (2) initializing an application program through a booting initializing program and executing an initial screen mode through the UI program, wherein the booting initializing program and the UI program are separate programs operating at least partially simultaneously; and
   (3) completing the initialization of the application program and the execution of the initial screen mode through the UI program, and switching from displaying a current screen to displaying an idle screen,
   wherein step (2) includes requesting the initialization of the application program from the booting initializing program, before the initial screen mode is executed through an application executing unit included in the UI program.

2. The method as claimed in claim 1, wherein step (3) includes switching from displaying the current screen to displaying the idle screen after completing the initialization of the application program and the execution of the initial screen mode.

3. The method as claimed in claim 2, wherein executing the initial screen mode includes displaying at least one of an animation, an image, and a moving picture.

4. The method as claimed in claim 1,
   wherein step (2) further includes, if the booting initialization unit completes the initialization of the application program, informing the application executing unit that the initialization of the application program has been completed by the booting initializing unit.

5. The method as claimed in claim 4, wherein step (3) includes determining, by the application executing unit after the execution of the initial screen mode has been completed, whether the booting initializing program has completed the initialization of the application program.

6. The method as claimed in claim 5, wherein step (3) includes switching from displaying the current screen to displaying the idle screen if the application executing unit determines that the initialization of the application program has been completed.

7. The method as claimed in claim 5, wherein step (3) includes, if the application executing unit determines that the initialization of the application program has not been completed, waiting, by the application executing unit, for the completion of the initialization of the application program.

8. The method as claimed in claim 4, wherein step (3) includes determining, by the application executing unit, whether the booting initializing program has completed the initialization of the application program during the execution of the initial screen mode.

9. The method as claimed in claim 8, wherein step (3) includes switching from displaying the current screen to displaying the idle screen if the application executing unit determines that the initialization of the application program is completed.

10. The method as claimed in claim 8, step (3) includes, upon a determination that the initialization of the application program has not been completed, waiting until the initialization of the application program is to be completed, and switching from displaying the current screen to displaying the idle screen after determining that the initialization of the application program is completed.

11. A apparatus for reducing booting time of a portable communication terminal, the apparatus comprising:
   a memory unit for storing a User Interface (UI) program for managing a UI corresponding to communications operations of the portable communication terminal during booting, a booting initializing program, and an application program;
   a display unit for displaying a screen; and
   a controller for driving the UI program stored from the memory, initializing the application program through the booting initializing program, executing an initial screen mode through the UI program, wherein the booting initializing program and the UI program are separate programs operating at least partially simultaneously, completing the initialization of the application program and the execution of the initial screen mode through the UI program, and switching from displaying a current screen to displaying an idle screen on the display unit,
   wherein the controller requests the initialization of the application program from the booting initializing program before the initial screen mode is executed through an application executing unit included in the UI program.

12. The apparatus as claimed in claim 11, wherein the controller switches from displaying the current screen to displaying the idle screen after completing the initialization of the application program and the execution of the initial screen mode.

13. The apparatus as claimed in claim 12, wherein the execution of the initial screen mode includes displaying at least one of an animation, an image, and a moving picture.

14. The apparatus as claimed in claim 11, wherein if the booting initialization unit completes the initialization of the application program, the controller informs the application executing unit that the initialization of the application program has been completed by the booting initializing unit.

15. The apparatus as claimed in claim 14, wherein the application executing unit determines whether the booting initializing program has completed the initialization of the application program after the execution of the initial screen mode has been completed.

16. The apparatus as claimed in claim 15, wherein the controller switches from displaying the current screen to displaying the idle screen on the display if the application executing unit determines that the initialization of the application program has been completed.

17. The apparatus as claimed in claim 15, wherein, if the application executing unit determines that the initialization of the application program has not been completed, the application executing unit waits for the completion of the initialization of the application program.

18. The apparatus as claimed in claim 14, wherein the application executing unit determines whether the booting initializing program has completed the initialization of the application program during the execution of the initial screen mode.

19. The apparatus as claimed in claim 18, wherein the controller switches from displaying the current screen to displaying the idle screen on the display if the application executing unit determines that the initialization of the application program is completed.

20. The apparatus as claimed in claim 18, wherein, upon a determination that the initialization of the application program has not been completed, the application executing unit waits until the initialization of the application program is to be completed, and the controller switches from displaying the current screen to displaying the idle screen after determining that the initialization of the application program is completed.

* * * * *